(No Model.)

A. BILLINGS.
HOSE REEL.

No. 289,960. Patented Dec. 11, 1883.

WITNESSES:

INVENTOR:
A. Billings
BY Munn & Co.
ATTORNEYS.

UNITED STATES PATENT OFFICE.

ALBERT BILLINGS, OF BERGEN POINT, NEW JERSEY.

HOSE-REEL.

SPECIFICATION forming part of Letters Patent No. 289,960, dated December 11, 1883.

Application filed May 25, 1883. (No model.)

*To all whom it may concern:*

Be it known that I, ALBERT BILLINGS, of Bergen Point, in the county of Hudson and State of New Jersey, have invented a new and Improved Hose-Reel, of which the following is a full, clear, and exact description.

The object of the invention is to have an upright hose-reel so constructed that every part of a hose wound upon it will stand at an angle or inclination in the line of its length, thereby causing the water adhering to its inner walls, after use, to drain off, causing the hose to dry out rapidly.

Reference is to be had to the accompanying drawings, forming part of this specification, in which similar letters of reference indicate corresponding parts in both the figures.

Figure 1:
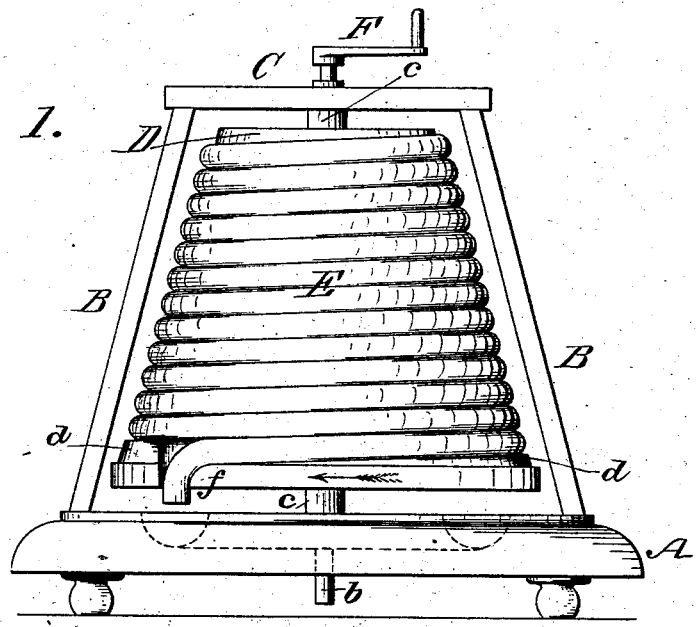
Figure 2:
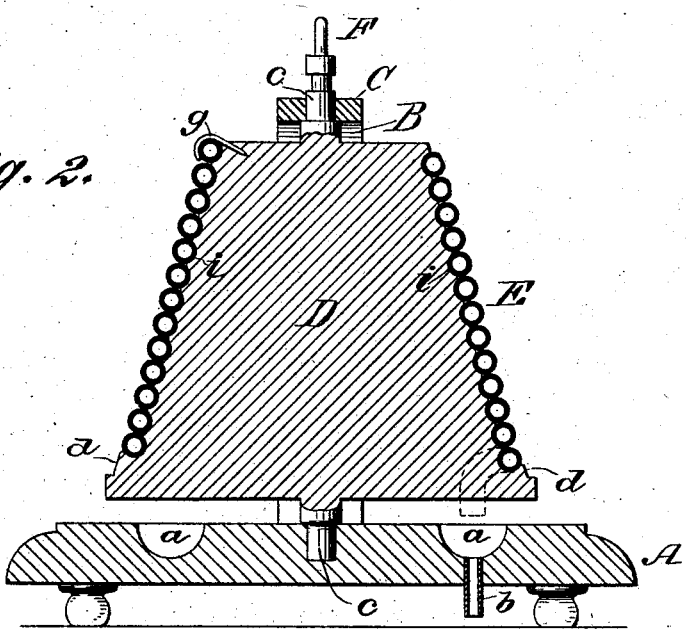

Figure 1 is a front elevation of my new and improved hose-reel, showing the hose wound upon it; and Fig. 2 is a sectional elevation of the same.

A represents the base of the hose-reel. This may be supported upon legs, as shown, or upon wheels. In the upper surface of this base A is formed the groove $a$, with the hole or small pipe $b$ leading out of it through the base. Rising from the base A are the uprights B B, and upon the upper ends of these uprights is secured the cross-piece C, and in the center of this cross-piece and center of the base A are journaled the gudgeons $c$ $c$ of the reel-head D. This reel-head D is by preference made in the form of a truncated cone, and at its lower end it is formed with the slanting or inclined ledge $d$, and this ledge has the hole $f$ made through it at its narrowest or thinnest portion, in which hole one end of the hose E is held. The upper gudgeon of the reel-head D is provided, above the cross-piece C, with the crank F, by which the head may be revolved for reeling up the hose. In reeling up the hose, one end of the hose will first be passed through the hole $f$. The reel-head D is then to be turned in the direction of the arrow, causing the first coil of hose to be laid upon the inclined ledge $d$. The next coil of hose coming upon the first, which is held at an inclination by the ledge $d$, will also take the same inclination and furnish an inclined support for the next coil, which will also be inclined, and in turn furnish an inclined base for the coil above, and so on throughout the whole length of the hose, thus causing every portion of the hose, when wound upon the reel, to have an inclination in the line of its length, which will cause the water adhering to the walls of the hose after use to drain out at its lower end into the groove $a$, and from thence it will pass away at the pipe $b$, leaving the hose dry upon the inside without extra trouble or attention.

At the upper end of the head D, I provide it with the hook $g$, by which the upper end of the coil of hose is held, so that it cannot leave the reel of its own accord. Other means for this purpose might be devised and not depart from the spirit of my invention, and in some cases I propose to spirally groove the outer surface of the reel-head D, as shown at $i$, to receive the coils of hose, as shown in Fig. 2; but I do not confine myself to such construction, as the reel is perfectly practical for its purpose with the outer surface of the reel-head made plain.

Having thus described my invention, what I claim as new, and desire to secure by Letters Patent, is—

1. A vertical hose-reel having a hole at the bottom to receive one end of the hose, and a curved hook, $g$, at the top to hold the other end, to retain the coil securely on the reel, as described.

2. A hose-reel having the inclined bottom ledge, $d$, leading to and ending in a hole, $f$, whereby the successive coils may rest upon one another in an inclined position, as shown and described.

3. The conical reel-head D, formed with the opening $f$, made in it for holding the lower end of the hose, substantially as described.

4. The horizontal base A, formed with the groove $a$ and passage $b$, in combination with the conical reel-head D, formed with the inclined ledge $d$, substantially as and for the purposes set forth.

5. The hose-reel herein shown and described, consisting of the horizontal base A, vertical conical reel-head D, uprights B B, cross-piece C, and crank F, the reel-head being formed with the inclined ledge $d$ and aperture $f$, and the base with the groove $a$ and pipe $b$, substantially as and for the purposes set forth.

ALBERT BILLINGS.

Witnesses:
H. A. WEST,
C. SEDGWICK.